(12) United States Patent
Harada (10) Patent No.: US 8,793,677 B2
(45) Date of Patent: Jul. 29, 2014

(54) ELECTRONIC APPARATUS, SOFTWARE UPDATE METHOD, AND STORAGE MEDIUM

(75) Inventor: Toru Harada, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 652 days.

(21) Appl. No.: 12/805,172

(22) Filed: Jul. 15, 2010

(65) Prior Publication Data

US 2011/0035739 A1 Feb. 10, 2011

(30) Foreign Application Priority Data

Aug. 5, 2009 (JP) ................................. 2009-182598

(51) Int. Cl.
  *G06F 9/44* (2006.01)
  *G06F 1/32* (2006.01)
  *G04B 23/06* (2006.01)
  G04B 23/02 (2006.01)

(52) U.S. Cl.
  CPC .. *G06F 9/44* (2013.01); *G06F 1/32* (2013.01); *G04B 23/06* (2013.01); *G04B 23/021* (2013.01)
  USPC .......................................... 717/168; 713/321

(58) Field of Classification Search
  CPC ............. G06F 9/44; G06F 1/32; G04B 23/06; G04B 23/021
  USPC .......................................... 717/168; 713/321
  See application file for complete search history.

(56) References Cited

U.S. PATENT DOCUMENTS

| 7,546,296 B2 | 6/2009 | Kimbara et al. |
| 7,610,246 B2 | 10/2009 | Harada |
| 7,634,481 B2 | 12/2009 | Harada et al. |
| 7,703,143 B2 | 4/2010 | Harada et al. |
| 2004/0145766 A1* | 7/2004 | Sugishita et al. ............ 358/1.13 |
| 2004/0187008 A1 | 9/2004 | Harada et al. |
| 2004/0268144 A1 | 12/2004 | Kimbara et al. |
| 2005/0159972 A1 | 7/2005 | Harada et al. |
| 2006/0031647 A1* | 2/2006 | Hirakawa et al. ............. 711/162 |
| 2006/0200421 A1* | 9/2006 | Harada .......................... 705/59 |

(Continued)

FOREIGN PATENT DOCUMENTS

| JP | 2003-067171 | 3/2003 |
| JP | 2004-160687 | 6/2004 |

(Continued)

OTHER PUBLICATIONS

Japanese Office Action dated Apr. 2, 2013, corresponding to Japanese Application No. 2009-182598.

*Primary Examiner* — Chat Do
*Assistant Examiner* — Lynda Dinh
(74) *Attorney, Agent, or Firm* — Harness, Dickey & Pierce, P.L.C.

(57) ABSTRACT

An electronic apparatus has a normal mode and an energy saving mode for reducing power consumption, and includes a main control unit, a sub control unit, a main storage unit, and a sub storage unit. The sub control unit includes a processing unit performing a part of an update process by storing software update data in the sub storage unit when a software update request is received during the energy saving mode. The main control unit includes a processing unit performing a rest of the update process by moving or copying the software update data from the sub storage unit to the main storage unit and by updating software stored in the main storage unit with the software update data after the electronic apparatus returns from the energy saving mode to the normal mode.

14 Claims, 5 Drawing Sheets

(56) References Cited

U.S. PATENT DOCUMENTS

| | | |
|---|---|---|
| 2006/0200868 A1 | 9/2006 | Harada |
| 2007/0198795 A1 | 8/2007 | Harada |
| 2008/0141050 A1* | 6/2008 | Senda ................... 713/321 |
| 2008/0235803 A1 | 9/2008 | Harada |
| 2009/0249346 A1 | 10/2009 | Harada et al. |
| 2010/0014113 A1* | 1/2010 | Iwashima ................... 358/1.15 |

FOREIGN PATENT DOCUMENTS

| | | |
|---|---|---|
| JP | 2004-249687 | 9/2004 |
| JP | 2007-251433 | 9/2007 |
| JP | 2009-006590 | 1/2009 |

* cited by examiner

ELECTRONIC APPARATUS, SOFTWARE UPDATE METHOD, AND STORAGE MEDIUM

BACKGROUND OF THE INVENTION

1. Field of the Invention

A certain aspect of the present invention relates to an electronic apparatus, a software update method for the electronic apparatus, and a computer-readable storage medium storing program code for causing a computer to perform the software update method.

2. Description of the Related Art

Japanese Patent Application Publication No. 2004-160687 discloses an image forming apparatus where power is supplied to a network interface card (NIC) and a CPU by a power control I/O to enable reception of an email message even when the main power switch is turned off. When receiving an email message, the disclosed image forming apparatus retrieves new or updated firmware and store the new firmware in, for example, a flash ROM.

Japanese Patent Application Publication No. 2003-067171 discloses an image processing apparatus having a power saving mode (or an energy saving mode) for reducing power consumption. If a firmware update request is received when the power saving mode is not active, the disclosed image processing apparatus' updates firmware and then switches to the power saving mode.

Here, an actual update of firmware needs to be performed while an electronic apparatus is in normal operating conditions (normal mode) even when there is no job to be processed.

With the image forming apparatus disclosed in Japanese Patent Application Publication No. 2004-160687, it is necessary to constantly activate many hardware components and therefore it is difficult to effectively save energy.

With the image processing apparatus disclosed in Japanese Patent Application Publication No. 2003-067171, it is not possible to receive a firmware update request and to update firmware unless the power saving mode is cancelled. In other words, the disclosed image processing apparatus can perform a firmware update process only in the normal mode and therefore cannot effectively save energy.

SUMMARY OF THE INVENTION

An aspect of the present invention provides an electronic apparatus having a normal mode and an energy saving mode for reducing power consumption. The electronic apparatus includes a main control unit controlling the electronic apparatus, a sub control unit operating during the energy saving mode, a main storage unit being managed by the main control unit, and a sub storage unit being managed by the sub control unit. The sub control unit includes a processing unit performing a part of an update process by storing software update data in the sub storage unit when a software update request is received during the energy saving mode. The main control unit includes a processing unit performing a rest of the update process by moving or copying the software update data from the sub storage unit to the main storage unit and by updating software stored in the main storage unit with the software update data after the electronic apparatus returns from the energy saving mode to the normal mode.

Another aspect of the present invention provides a software update method performed by an electronic apparatus having a normal mode and an energy saving mode for reducing power consumption. The electronic apparatus includes a main control unit controlling the electronic apparatus; a sub control unit operating during the energy saving mode; a main storage unit being managed by the main control unit; and a sub storage unit being managed by the sub control unit. The software update method includes the steps of performing, by the sub control unit, a part of an update process by storing software update data in the sub storage unit when a software update request is received during the energy saving mode; and performing, by the main control unit, a rest of the update process by moving or copying the software update data stored in the sub storage unit to the main storage unit and updating software stored in the main storage unit with the software update data after the electronic apparatus returns from the energy saving mode to the normal mode.

DESCRIPTION OF THE PREFERRED EMBODIMENTS

Preferred embodiments of the present invention are described below with reference to the accompanying drawings.

Figure 1:
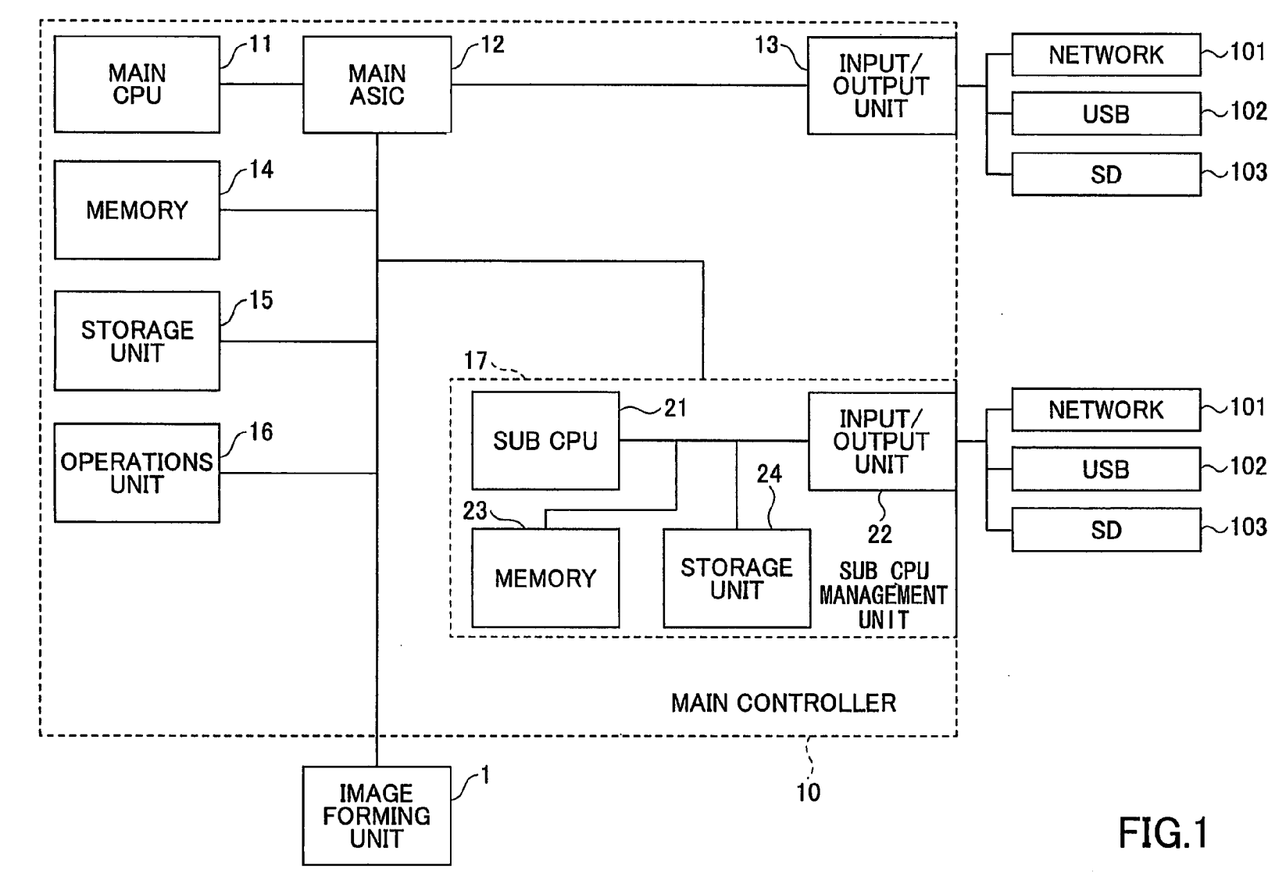
FIG. 1 is a block diagram illustrating a hardware configuration of a printer that is an example of an electronic apparatus according to an embodiment of the present invention.

FIG. 1 is a block diagram illustrating a hardware configuration of a printer that is an example of an electronic apparatus according to an embodiment of the present invention.

The printer includes a main controller 10 and an image forming unit 1 as hardware components for forming an image.

The main controller (main control unit) 10 controls the entire printer (other components of the printer) and includes a main CPU 11, a main ASIC (application specific integrated circuit) 12, an input/output unit 13, a memory 14, a storage unit 15, an operations unit 16, and a 'sub CPU management unit 17. The sub CPU management unit 17 may be provided as an external unit and connected to the main controller 10. In this embodiment, although the sub CPU management unit 17 is a part of the main controller 10, the main controller 10 and the sub CPU management unit 17 may be referred to as if they are different units for descriptive purposes.

The main CPU 11 controls and manages other components of the main controller 10 via the main ASIC 12. For example, the main CPU 11 causes the main ASIC 12 to load software including firmware stored in the storage unit 15 into the memory 14 and executa the software in order to control hardware components of the printer, and thereby implement various functions such as a processing unit, a loading unit, an information management unit, and a state management unit of this embodiment.

The main ASIC 12 enables sharing of devices (or units) to be controlled by the main CPU 11 and provides an architecture that makes it possible to efficiently develop application programs (hereafter, may be simply called "applications").

The input/output unit 13 outputs and inputs data to and from an external apparatus (e.g., a personal computer (PC))

on a network 101 (e.g., a local area network (LAN)), a universal serial bus (USB) memory 102, and an SD card 103. The input/output unit 13 may also be configured to output and input data to and from a storage medium other than the USB memory 102 and the SD card 103, a storage unit such as an HDD, and an external apparatus (e.g., a PC) including a storage medium or a storage unit.

The memory 14, for example, is implemented by a RAM and is used as a program memory for loading a program (software) to be executed by the main CPU 11, a working memory for data processing by the main CPU 11, and an image memory for loading image data. The storage unit (main storage unit) 15 is, for example, implemented by a nonvolatile storage unit such as a flash ROM, a hard disk drive (HDD), or an SD card and stores software such as firmware and applications and data such as image data.

The operations unit 16 is a user interface for operating the printer and includes various operation keys (operation switches or operation buttons) for entering data and commands and a display unit such as an LCD or a CRT display for displaying information. The sub CPU management unit (sub control unit) 17 includes a sub CPU 21, an input/output unit 22, a memory 23, and a storage unit 24.

The sub CPU 21 controls and manages other components of the sub CPU management unit 17. For example, the sub CPU 21 loads software including firmware stored in the storage unit 24 into the memory 23 and executes the software in order to control other components and thereby to implement various functions such as a processing unit and a setting unit of this embodiment.

The input/output unit 22 has functions similar to those of the input/output unit 13.

The memory 23, for example, is implemented by a RAM and is used as a program memory for loading a program to be executed by the sub CPU 21 and a working memory for data processing by the sub CPU 21.

The storage unit (sub storage unit) 24 is, for example, implemented by a nonvolatile storage unit such as a flash ROM, a hard disk drive (HDD), or an SD card and stores at least software used in an energy saving mode.

The image forming unit 1 forms (prints) an image on a recording medium such as paper according to image data read from the memory 14 or the storage unit 15 and is, for example, implemented by a plotter. When image data ready for printing are received by the input/output unit 13 from an external apparatus (e.g., on the network 101) and stored in the memory 14, the image data are transferred to the image forming unit 1 without change. Meanwhile, print data such as character code data or graphics data are received and stored in the memory 14, the print data are converted (or expanded) into image data for printing by the main CPU 11 and the main ASIC 12 and the image data are transferred to the image forming unit 1.

Figure 2:
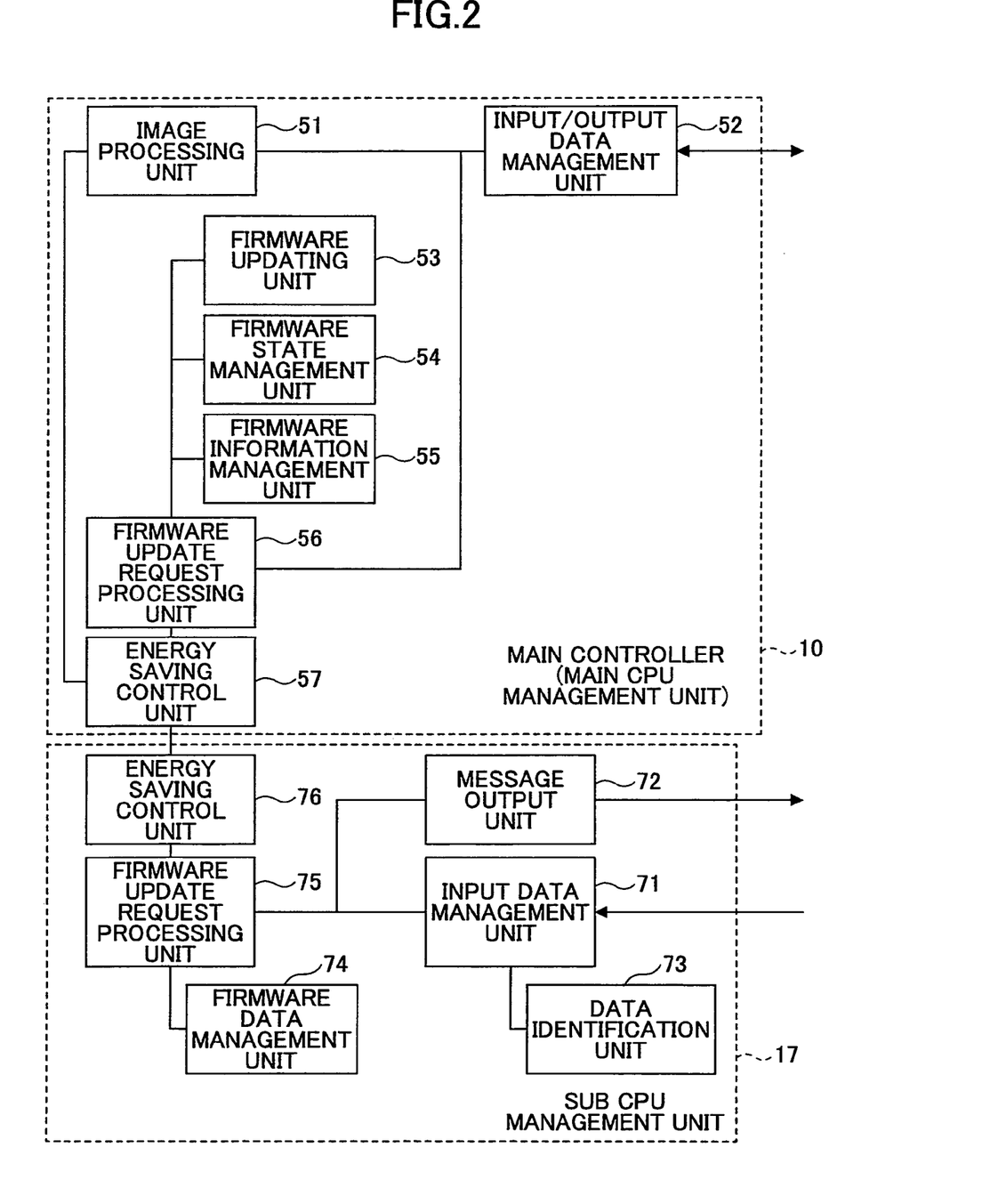
FIG. 2 is a block diagram illustrating an exemplary software configuration of the printer shown in FIG. 1.

FIG. 2 is a block diagram illustrating an exemplary software configuration of the printer shown in FIG. 1. Functional units shown in FIG. 2 are implemented by executing programs by the main CPU 11 or the sub CPU 21. In other words, the main CPU 11 and the sub CPU operate according to programs to implement the functional units.

The main CPU 11 of the main controller 10 reads programs corresponding to an image processing unit 51, an input/output data management unit 52, a firmware updating unit 53, a firmware state management unit 54, a firmware information management unit 55, a firmware update request processing unit 56, and an energy saving control unit 57 from the storage unit 15, and loads the programs into the memory 14.

The image processing unit 51 processes image data.

The input/output data management unit 52 manages data input from or output to an external device or an external storage medium.

The firmware updating unit 53 updates firmware.

The firmware state management unit 54 manages states of firmware.

The firmware information management unit 55 manages information on firmware.

The firmware update request processing unit 56 processes a firmware update request.

The energy saving control unit 57 controls processes for saving energy.

The sub CPU 21 of the sub CPU management unit 17 loads programs corresponding to an input data management unit 71, a message output unit 72, a data identification unit 73, a firmware data management unit 74, a firmware update request processing unit 75, and an energy saving control unit 76 into the memory 23.

The input data management unit 71 manages data input from an external apparatus or an external storage medium.

The message output unit 72 outputs (displays or reports) various messages.

The data identification unit 73 identifies data input (or received) from an external apparatus or an external storage medium.

The firmware data management unit 74 manages firmware data.

The firmware update request processing unit 75 processes a firmware update request.

The energy saving control unit 76 controls processes for saving energy.

Next, processes performed by the printer configured as described above are described with reference to FIGS. 3 through 5 as various embodiments of the present invention.

<First Embodiment>

A first embodiment of the present invention is described below.

After the printer switches to an energy saving mode for reducing power consumption, only the sub CPU management unit 17 controls external input and output.

Although input/output units are provided separately for the main controller 10 and the sub CPU management unit 17 in FIG. 1, a common input/output unit may be provided for the main controller 10 and the sub CPU management unit 17 if components to be managed by the sub CPU 21 are implemented as an ASIC that is controllable by the main CPU 11.

When the printer switches to the energy saving mode, the main CPU 11 transfers information necessary even during the energy saving mode to the sub CPU 21 and stores other information in the storage unit 15, and the power of the main controller 10 except the sub CPU management unit 17 is turned off.

The sub CPU 21 of the sub CPU management unit 17 mainly filters network packets and waits for a user request (or a return trigger) triggering a return to a normal mode.

In filtering network packets, the sub CPU 21 uses a data pattern to identify firmware update data (or a firmware update request). Here, "firmware update" indicates updating or upgrading firmware. Also, "firmware update data" indicate a program and/or data for updating the firmware. In the descriptions below, the firmware update data may be equated with a firmware update request.

Figure 4:
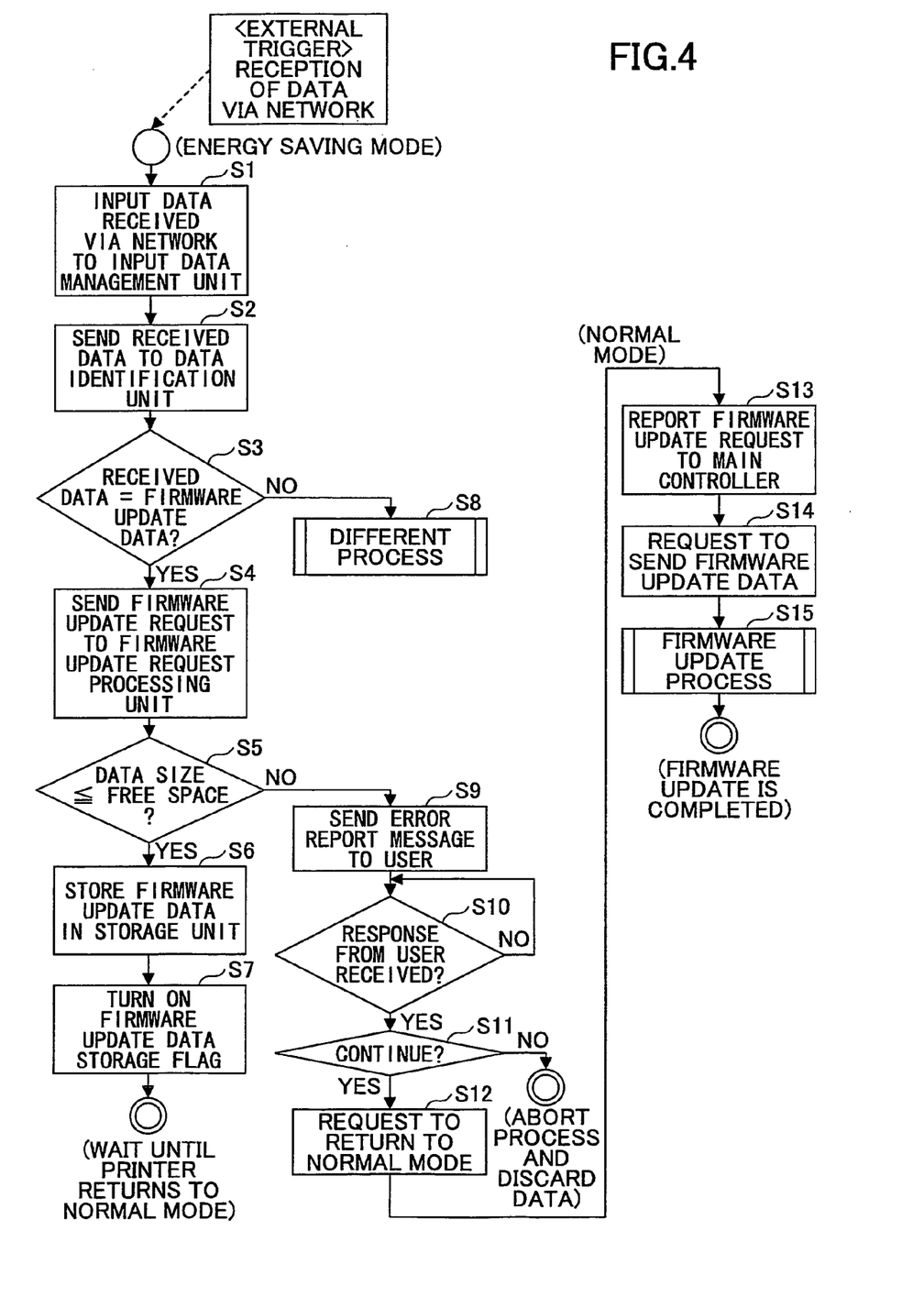
FIG. 4 is a flowchart showing a firmware update request process performed by a sub CPU management unit 17 shown in FIG. 1.

FIG. 4 shows an exemplary firmware update request process performed by the sub CPU management unit 17 when receiving the firmware update data in the energy saving mode.

When data (an external trigger) are received from an external apparatus via the network 101 during the energy saving mode, the received data are input to the input data management unit 71 of the sub CPU management unit 17 in step S1 and the input data management unit 71 sends the received data to the data identification unit 73 in step S2. Then, in step S3, the data identification unit 73 determines whether the received data are firmware update data.

If the received data are firmware update data, the input data management unit 71, in step S4, requests the firmware update request processing unit 75 to perform a firmware update process (i.e., sends a firmware update request to the firmware update request processing unit 75). If the received data are not firmware update data, the input data management unit 71 proceeds to step S8 where a different process (e.g., requested by a user) is performed.

In step S5, the firmware update request processing unit 75 determines whether the size of the firmware update data is less than or equal to the size of free space in the storage unit 24.

If the size of the firmware update data is greater than the size of free space in the storage unit 24, the process goes to step S9 described later.

If the size of the firmware update data is less than or equal to the size of free space in the storage unit 24, the firmware update request processing unit 75 temporarily stores the firmware update data in the storage unit 24 in step S6. After storing the firmware update data, the firmware update request processing unit 75, in step S7, turns on (sets to "1") a firmware update data storage flag (e.g., a bit variable) indicating that the firmware update data have been stored. The firmware update data storage flag is stored in the memory 23 or the storage unit 24. When the printer returns from the energy saving mode to the normal mode, the energy saving control unit 57 of the main controller 10 checks the firmware update data storage flag. If the firmware update data storage flag is on, the firmware update process is continued at appropriate timing after returning from the energy saving mode to the normal mode.

Figure 5:
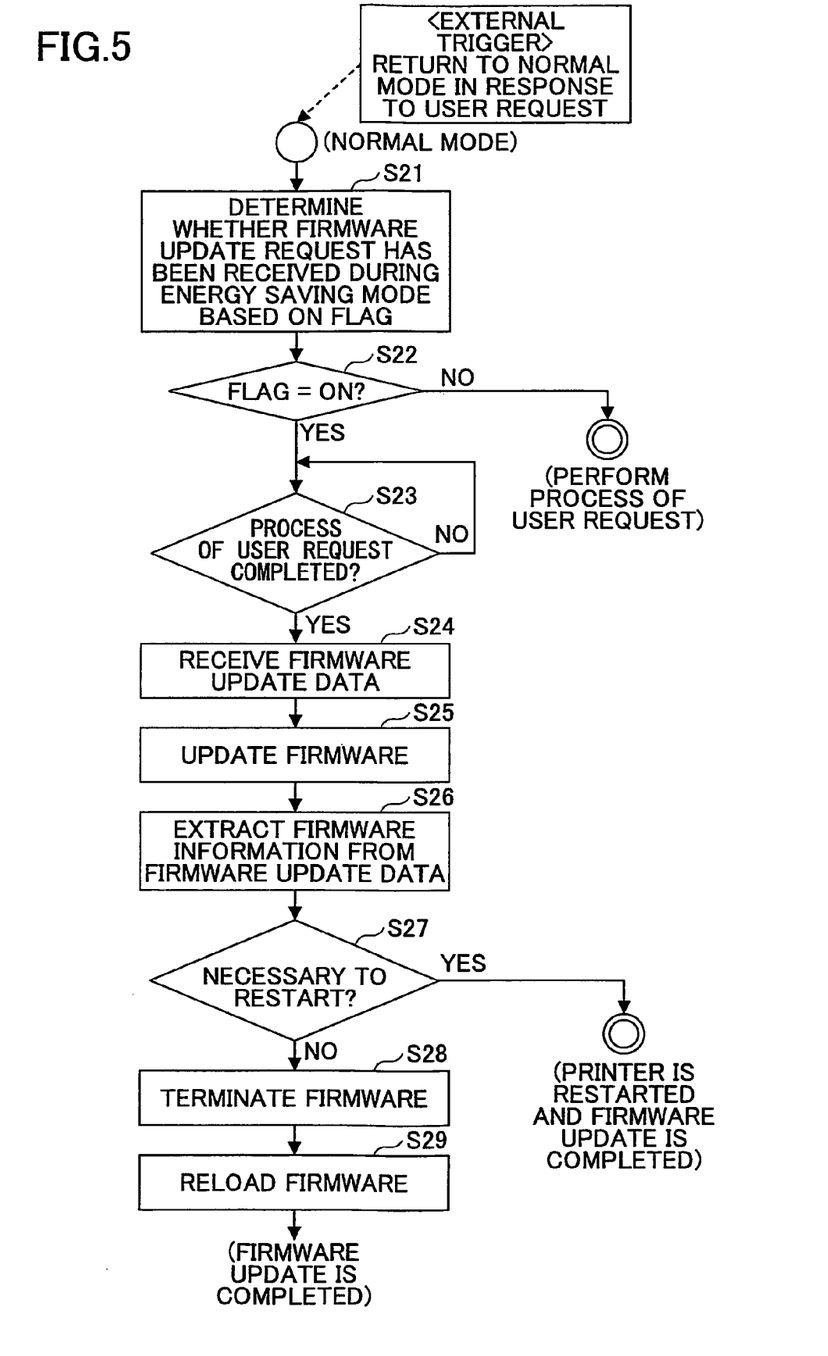
FIG. 5 is a flowchart showing a firmware update process performed by a main controller 10 shown in FIG. 1.

FIG. 5 is a flowchart showing an exemplary firmware update process performed by the main controller 10 after the printer returns from the energy saving mode to the normal mode.

Triggers causing the printer to return from the energy saving mode to the normal mode include, for example, pressing of the main power key (a simple return request) and user requests such as a print request sent from the network 101. When the electronic apparatus is a multifunction peripheral, user requests may include, in addition to a print request (a request for printing), a copy request (a request for copying) made by setting a document on an automatic document feeder (ADF) or by opening and/or closing a pressing plate, and a fax request (a request for reception of a facsimile message).

Here, user requests such as a print request having priority over the firmware update process are preferably processed before the firmware update process is performed.

For this purpose, information indicating user requests having priority over the firmware update process is stored beforehand in the storage unit 15 of the main controller 10. After the printer returns' from the energy saving mode to the normal mode, the energy saving control unit 57 checks the firmware update data storage flag in the memory 23 or the storage unit 24 of the sub CPU management unit 17. If the firmware update data storage flag is on, but the return trigger is a user request having priority over the firmware update process, a process requested by the user request is performed before performing the firmware update process.

This configuration makes it possible to minimize the time lag before a user request is processed.

Referring to FIG. 5, when the printer returns from the energy saving mode to the normal mode in response to a user request (external trigger), the energy saving control unit 57, in steps S21 and S22, checks the firmware update data storage flag and thereby determines whether a firmware update request has been received during the energy saving mode.

If the firmware update data storage flag is "0" (off), i.e., if no firmware update request has been received during the energy saving mode, the firmware update process is terminated and a process requested by the user request is performed (except when the user request is a simple return request made by pressing the main power key).

If the firmware update data storage flag is "1" (on), i.e., if a firmware update request has been received during the energy saving mode, the energy saving control unit 57 waits, in step S23, until the process requested by the user request is completed. When the process requested by the user request is completed, i.e., when the printer becomes idle so that the firmware can be safely terminated, the energy saving control unit 57 reports the firmware update request to the firmware update request processing unit 56 to continue (or resume) the firmware update process. When the user request is a simple return request made by pressing the main power key, the energy saving control unit 57 reports the firmware update request to the firmware update request processing unit 56 to continue (or resume) the firmware update process without waiting for the completion of a process requested by the user request.

As an alternative, the above process may be performed without using the firmware update data storage flag. In this case, when the printer returns from the energy saving mode to the normal mode, the energy saving control unit 76 or the firmware update request processing unit 75 reports that the firmware update request has been received during the energy saving mode to the firmware update request processing unit 56 of the main controller 10 if the firmware update data are stored in the storage unit 24 of the sub CPU management unit 17, and the firmware update request processing unit 56 takes over the firmware update process from step S23.

In the main controller 10, the firmware update request processing unit 56 requests the sub CPU management unit 17 to send the firmware update data stored in the storage unit 24, receives the firmware update data, and copies (or moves) the firmware update data to the storage unit 15. After the firmware update data are copied, the firmware update data in the storage unit 24 of the sub CPU management unit 17 are removed.

Soon after the firmware update data are copied to the storage unit 15 of the main controller 10, the firmware update request processing unit 56, in step S25, requests the firmware updating unit 53 to update the firmware in the storage unit 15 with the firmware update data.

In some electronic apparatuses, program data are stored in a file system similar to that of UNIX (registered trademark) or stored as image data in a RAM. In the first embodiment, it is assumed that programs are loaded into the memory 14 before being executed.

Therefore, rewriting programs (firmware) remaining in the storage unit 15 after the programs are loaded into the memory 14 does not directly affect the operation of the system (printer) and is therefore relatively safe.

If it is necessary to stop the system before rewriting programs or data in the storage unit 15, the firmware update process may be changed accordingly.

After the firmware in the storage unit 15 is updated, the firmware update request processing unit 56 requests the firmware information management unit 55 to extract firmware information (described later) from the firmware update data in step S26 and to determine whether it is necessary to restart the printer in step S27. If restart is necessary, the firmware update request processing unit 56 terminates the firmware update process. Then, the printer is restarted and the firmware update is completed. If restart is not necessary, the firmware update request processing unit 56 terminates, in step S28, only the firmware in the memory 14 that is to be updated and reloads the corresponding firmware from the storage unit 15 into the memory 14. Thus, the firmware can be updated without affecting other parts of the system.

Whether restart is necessary to update a firmware program can be determined by analyzing the dependency between the firmware program and other firmware programs. If the firmware program is stand-alone or related to only a small number of programs and temporarily terminating the firmware program does not affect the operation of the main system, the firmware program can be terminated.

For example, static parameters (firmware information) indicating firmware-programs that can be updated without restarting the printer may be stored in the storage unit 15 in advance and the firmware information management unit 55 may be configured to determine whether restart is necessary based on the static parameters. As another example, the static parameters may be included in the firmware update data and the firmware information management unit 55 may be configured to determine whether restart is necessary based on the static parameters in the firmware update data.

The execution states (running or not running) of firmware programs can be determined by the firmware state management unit 54. The firmware state management unit 54, for example, refers to the scheduler of the operating system (OS) and thereby determines the execution states of firmware programs.

As described above, firmware is updated by the firmware updating unit 53. The firmware updating unit 53 overwrites (updates) program data stored in the storage unit 15 with the firmware update data and verifies the updated program data.

When data are received via the network 101 from an external apparatus during the normal mode, the main controller 10 performs a process as described below.

When receiving data, the input/output data management unit 52 sends the received data to a data identification unit (not shown) and requests the data identification unit to determine whether the received data are firmware update data. If the received data are firmware update data, the input/output data management unit 52 sends a firmware update request to the firmware update request processing unit 56.

When receiving the firmware update request, the firmware update request processing unit 56 determines whether a process requested by a user request is being performed. If no process requested by a user request is being performed, the firmware update request processing unit 56 receives the firmware update data from the input/output data management unit 52 and stores the firmware update data in the storage unit 15. If a process requested by a user request is being performed, the firmware update request processing unit 56 waits for the completion of the process, and then receives the firmware update data from the input/output data management unit 52 and stores the firmware update data in the storage unit 15. After storing the firmware update data in the storage unit 15, the firmware update request processing unit 56 requests the firmware updating unit 53 to update the firmware in the storage unit 15 with the firmware update data and performs substantially the same steps as steps S26 through S29.

Thus, in the first embodiment, when a firmware update request is received during the energy saving mode, the sub CPU 21 of the sub CPU management unit 17 stores firmware update data in the sub storage unit 24 (i.e., performs a part of a firmware update process); and when the printer returns from the energy saving mode to the normal mode, the main CPU 11 of the main controller 10 copies or moves the firmware update data from the sub storage unit 24 to the main storage unit 15 and updates firmware stored in the main storage unit 15 with the firmware update data (i.e., performs a rest of the firmware update process). This configuration makes it possible to process a firmware update request even during the energy saving mode.

Also in the first embodiment, when the printer returns from the energy saving mode to the normal mode, the main CPU 11 terminates firmware in the memory 14 if it is determined that the firmware can be safely terminated; updates the corresponding firmware in the main storage unit 15 only if the firmware state management unit 54 determines that the firmware is terminated; and then reloads the updated firmware into the memory 14. This configuration makes it possible to eliminate the need to unnecessarily restart an electronic apparatus and thereby to improve the usability.

Further in the first embodiment, if a firmware (software) update request is received during the energy saving mode but a user request (e.g., a print request) triggering the return from the energy saving mode to the normal mode has priority over the firmware (software) update process, the main CPU 11 performs the firmware update process after completing a process requested by the user request. This configuration makes it possible to minimize the time lag before a user request is processed and thereby to reduce the processing delay.

<Second Embodiment>

Next, a second embodiment of the present invention is described.

The second embodiment discloses an additional feature to the first embodiment. Specifically, the second embodiment discloses a process performed when the size of firmware update data is greater than the size of free space in the storage unit 24 of the sub CPU management unit 17.

Referring to FIG. 4, if the size of firmware update data is greater than the size of free space in the storage unit 24 of the sub CPU management unit 17, the firmware update request processing unit 75 of the sub CPU management unit 17 suspends the firmware update process (particularly, the step of storing the firmware update data in the storage unit 24) and proceeds to step S9. In step S9, the firmware update request processing unit 75 generates a message (error report message) indicating that the firmware update process cannot be continued and reports (sends) the message (via the message output unit 72) to the user. Alternatively, the firmware update process may be aborted when the size of the firmware update data is greater than the size of free space in the storage unit 24.

When the firmware update request is received during the energy saving mode via the network 101 from an external apparatus such as a PC being used by the user, the error report message is transmitted as a network packet(s) via the network 101 to the external apparatus and is displayed, for example, in an error popup window on a display unit of the external apparatus. When the printer is being used stand-alone and the firmware update request is directly input to the printer during the energy saving mode by using an external storage medium (e.g., the USB memory 102 or the SD card 103) connected directly to the printer, the error report message is displayed, for example, in an error popup window on the operations unit 16 for user operations.

Figure 3:
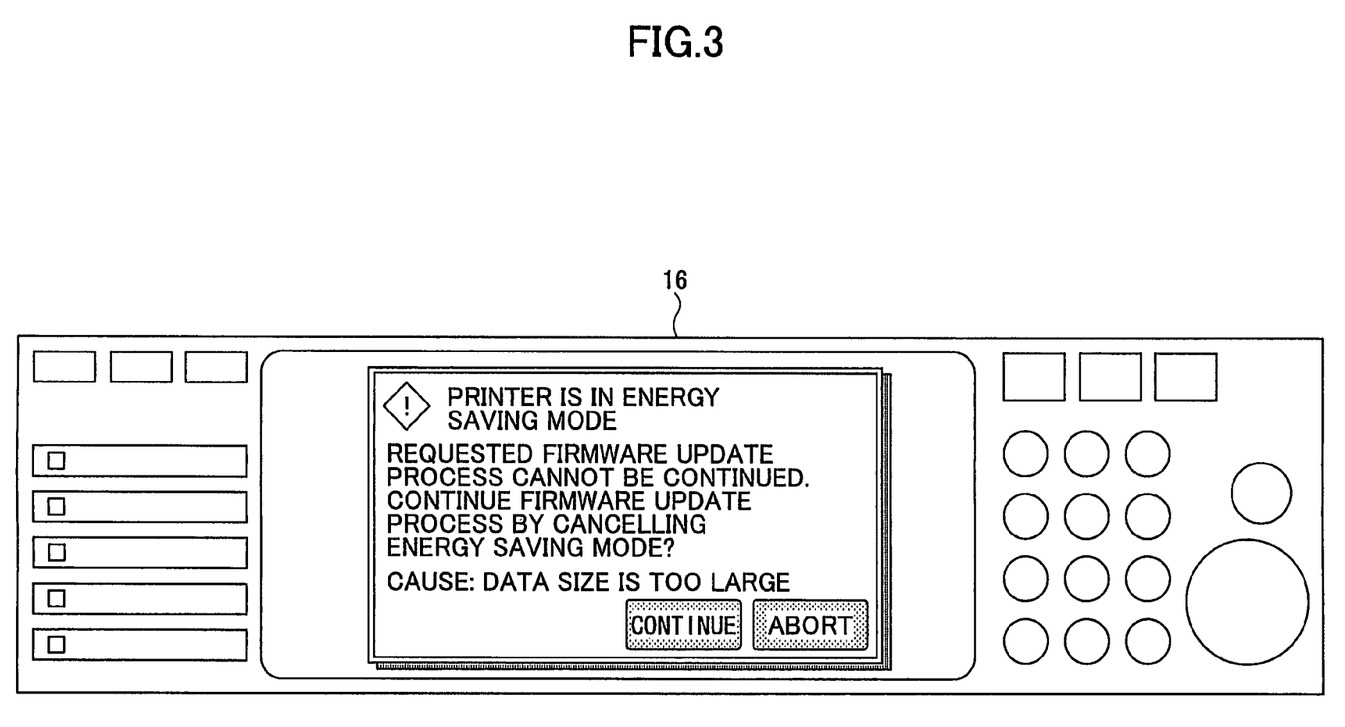
FIG. 3 is a drawing illustrating an exemplary error report message displayed on an operations unit 16 shown in FIG. 1.

FIG. 3 shows an example of the error report message.

As shown in FIG. 3, the error report message includes information indicating the occurrence of an error, i.e., information indicating that the firmware update process cannot be continued because the data size is too large. In this example, the error report message is accompanied by a Continue button for requesting to continue the firmware update process by cancelling the energy saving mode and an Abort button for requesting to abort the firmware update process.

Referring back to FIG. 4, after sending the error report message, the firmware update request processing unit 75 waits for a response from the user in step S10.

When a response is received from the user, the firmware update request processing unit 75 determines the content of the response in step S11. If the response is a request to continue the firmware update process, the firmware update request processing unit 75 proceeds to step S12 and requests the energy saving control unit 76 to cause the printer to return from the energy saving mode to the normal mode.

After the printer returns from the energy saving mode to the normal mode in response to the request to continue the firmware update process, the energy saving control unit 76 reports the return to the normal mode to the energy saving control unit 57 of the main controller 10. Then, in step S13, the energy saving control unit 57 reports the firmware update request to the firmware update request processing unit 56.

When receiving the firmware update request, the firmware update request processing unit 56 requests the sub CPU management unit 17 to send the firmware update data in step S14 and performs the firmware update process in step S15 (corresponds to steps S24 through S29 in FIG. 5). Alternatively, in step S14, the firmware update request processing unit 56 may obtain the firmware update data by requesting the sending end (original source) to retransmit the firmware update data.

Meanwhile, if the response from the user in step S11 is a request to abort the firmware update process, the firmware update request processing unit 75 aborts the firmware update process and the firmware update data are discarded.

Thus, in the second embodiment, the sub CPU 21 determines whether the size of firmware update data is greater than the size of free space in the sub storage unit 24; suspends the firmware update process if the size of firmware update data is greater than the size of free space in the sub storage unit 24; reports to the user that the firmware update process cannot be continued; and causes the printer to return from the energy saving mode to the normal mode only if the user requests to continue the firmware update process. When the printer returns from the energy saving mode to the normal mode in response to the request to continue the firmware update process, the main CPU 11 (immediately) performs the firmware update process. This configuration makes it possible to safely update firmware even if the size of firmware update data is greater than the size of free space in the sub storage unit 24. In other words, this configuration provides a fail-safe mechanism.

Also in the second embodiment, when the printer is being used stand-alone and the firmware (software) update request is directly input to the printer during the energy saving mode, the error report message indicating that the firmware (software) update process cannot be continued is displayed on the operations unit 16; and when the firmware (software) update request is received via the network 101 from an external apparatus during the energy saving mode, the error report message is sent to the external apparatus. This configuration makes it possible to reliably report the error report message to the user.

<Third Embodiment>

Next, a third embodiment of the present invention is described.

The third embodiment discloses an additional feature to the second embodiment.

In the second embodiment, the user is allowed to determine whether to continue the firmware update process. This enables the user to select not to update the firmware in order to give priority to energy saving.

In the third embodiment, the user is allowed to set an option (firmware update option) indicating whether a firmware update process is continued automatically or based on a user decision (or whether it is allowed to automatically continue the firmware update process).

For example, the user may be allowed to set the firmware update option on a management screen displayed on the operations unit 16 and the firmware update option may be stored in the storage unit 24.

If it is not preferable to allow an end user to set the firmware update option, the management screen may be configured to allow only an administrator (who has an administrative right) to set the firmware update option.

When it is determined, in step S5 of FIG. 4, that the size of the firmware update data is greater than the size of free space in the storage unit 24 of the sub CPU management unit 17, the firmware update request processing unit 75 determines whether to automatically continue the firmware update process based on the firmware update option. The firmware update request processing unit 75 proceeds to step S12 when automatically continuing the firmware update process, or proceeds to step S9 when not automatically continuing the firmware update process.

Thus, in the third embodiment, a firmware update option, which indicates whether to automatically continue a firmware update process when the size of firmware update data is greater than the size of free space in the sub storage unit 24, is predetermined. The sub CPU 21 determines whether the size of firmware update data is greater than the size of free space in the sub storage unit 24; determines whether to continue the firmware update process based on the firmware update option if the size of firmware update data is greater than the size of free space in the sub storage unit 24; and causes the printer to return from the energy saving mode to the normal mode only when it is determined to automatically continue the firmware update process. When the printer returns from the energy saving mode to the normal mode in response to the determination result to automatically continue the firmware update process, the main CPU 11 (immediately) performs the firmware update process. This configuration makes it possible to safely and reliably update firmware even if the size of firmware update data is greater than the size of free space in the sub storage unit 24.

<Fourth Embodiment>

Next, a fourth embodiment of the present invention is described.

The fourth embodiment discloses an additional feature to the first through third embodiments.

In the fourth embodiment, it is assumed that a request to access the USB memory 102 or the SD card 103 is entered by the user via the operations unit 16, and a firmware update request is made via the USB memory 102 or the SD card 103. In this embodiment, each of the USB memory 102 and the SD card 103 is called an external storage medium.

A firmware update process of the fourth embodiment is similar to that of the first embodiment except that a firmware update request is made via an external storage medium. Accordingly, unlike a case where a firmware update request is received via the network 101, it is not possible to perform interactive communications between the printer and the external storage medium. Therefore, in the fourth embodiment, one of two update programs is selected based on whether the printer is in the energy saving mode or the normal mode. Here, it is assumed that the update programs are stored in the external storage medium together with the firmware update data. However, the update programs may instead be stored in the storage unit 15.

In the fourth embodiment, two update programs are provided based on an assumption that the sub CPU 21 and the main CPU 11 have different architectures. When the firmware update request is received via the network 101, only the firmware update data need to be transferred via the network 101 and the firmware is updated by the main CPU 11. Therefore, in this case, it is not necessary to provide programs for different architectures. Meanwhile, when the firmware update request is made via the external-storage medium, it is necessary to provide programs for different architectures to enable communications between the user and the external storage medium.

Each of the update programs at least includes a function (to cause the main CPU 11 or the sub CPU 21) to read firmware update data from the external storage medium (the USB memory 102 or the SD card 103) via the input/output unit 22.

To improve the security, each of the update programs may also include a function to verify the firmware update data and a function to perform an authentication process between the external storage medium and the printer.

Thus, in the fourth embodiment, a storage medium stores firmware (software) update data and update programs to be executed during the energy saving mode and the normal mode, respectively, to transfer the firmware (software) update data to the printer. When a firmware update request is made via the storage medium during the normal mode, the main CPU 11 of the main controller 10 reads the firmware (software) update data from the storage medium according to a corresponding one of the update programs and then updates the firmware (software). Meanwhile, when a firmware update request is made via the storage medium during the energy saving mode, the sub CPU 21 of the sub CPU management unit 17 reads the firmware (software) update data according to the other one of the update programs and performs a part of the firmware (software) update process as described above. This configuration makes it possible to save energy by using the sub CPU 21 as well as to process firmware update requests from various sources (e.g., an external apparatus on a network and storage media such as a USB memory and an SD card).

Also with the above configuration, even when the main CPU 11 and the sub CPU 21 have different hardware architectures, the main CPU 11 or the sub CPU 21 can execute at least one of the update programs in the storage medium (a USB memory or an SD card) corresponding to different printer modes (the energy saving mode and the normal mode).

Meanwhile, if a printer does not include a sub CPU, it is necessary to maintain power supply to at least a main CPU, an NIC, a program memory, and a storage unit of the main controller even during the energy saving mode. Since a high-speed CPU is normally used as the main CPU to perform, for example, a printing process, maintaining power supply to the main CPU during the power saving mode only to transfer and store firmware update data reduces the effectiveness of energy saving. Also, with such a configuration, an input/output unit is normally turned off during the energy saving mode.

In the above embodiments, processes and configurations for updating firmware while saving energy are described. However, the above embodiments may also be applied to processes and configurations for updating other types of software and data.

In the above embodiments, a printer having a communication function is used as an example of an electronic apparatus. However, the present invention may also be applied to various electronic apparatuses having a communication function. For example, the present invention may be applied to image forming apparatuses such as a copier, a facsimile machine, and a multifunction peripheral; home network appliances; vending machines; medical equipment; power supply devices; air conditioning systems; measuring systems for measuring usage of gas, water, and electricity; audio-visual apparatuses; game machines; and computers connectable to a network.

<Programs>

The main CPU 11 controls hardware components of the printer (an electronic apparatus) during the normal mode by executing programs and thereby implements a processing unit, a loading unit, an information management unit, and a state management unit according to an embodiment of the present invention. Meanwhile, the sub CPU 21 controls hardware components of the printer (an electronic apparatus) mainly during the energy saving mode and thereby implements a processing unit and a setting unit according to an embodiment of the present invention. In other words, a firmware update process according to an embodiment of the present invention is performed by executing programs by the main CPU 11 and the sub CPU 21.

Such programs may be stored beforehand in a storage unit of an electronic apparatus such as a ROM, a nonvolatile memory (e.g., a flash ROM or an EEPROM), or an HDD; or supplied in a (nonvolatile) storage medium such as a CD-ROM, a memory card, a flexible disk, an MO disk, a CD-R, a CD-RW, a DVD+R, a DVD+RW, a DVD-R, a DVD-RW, or a DVD-RAM. Programs stored in such a storage medium may be executed by a CPU (main CPU or sub CPU) after they are installed into an electronic apparatus or may be read from the storage medium when they are executed by the CPU.

Also, programs may be downloaded from an external apparatus connected to a network and having a storage medium or a storage unit containing the programs.

As described above, embodiments of the present invention make it possible to process a software update request even during an energy saving mode as well as to effectively save energy. In other words, embodiments of the present invention make it possible to provide an electronic apparatus that can reliably update software while effectively saving energy.

The present invention is not limited to the specifically disclosed embodiments, and variations and modifications may be made without departing from the scope of the present invention.

The present application is based on Japanese Priority Application No. 2009-182598, filed on Aug. 5, 2009, the entire contents of which are hereby incorporated herein by reference.

What is claimed is:

1. An electronic apparatus having a normal mode and an energy saving mode for reducing power consumption, the electronic apparatus comprising:
 a main control unit configured to update software; and
 a sub control unit configured to store software update data associated with the software update request, when a software update request is received from an outside during the energy saving mode,
 wherein the main control unit includes a first processor that performs the updating process for updating software stored by the sub control unit when the electronic apparatus returns from the energy saving mode; wherein the sub control unit includes,
a determining unit that, when the software update request is received during the energy saving mode, is configured to determine if the software update data associated to the software update request is storable based on a size of the software update data and a size of free space in a storage unit configured to store the software update data;
wherein when the determining unit determines that the software update data is not storable, the sub control unit requests the main control unit to cause the electronic apparatus to return from the energy saving mode to the normal mode; and
wherein when the determining unit determines that the software update data is storable, the sub control unit performs a control so that the main control unit performs the updating process after the electronic apparatus returns from the energy saving mode to the normal mode; and
a second processor is configured to,
determine whether a size of the software update data is greater than a size of free space in the sub storage unit,
suspend the update process and report, to a user, error information indicating that the update process cannot be continued if the size of the software update data is greater than the size of the free space, and
cause the electronic apparatus to return from the energy saving mode to the normal mode only if the user requests to continue the update process;
wherein the first processor performs the update process if the electronic apparatus is caused to return from the energy saving mode to the normal mode in response to the request to continue the update process, and
wherein if the software update request is received and the electronic apparatus returns from the energy saving mode to the normal mode in response to a user request having priority over the update process, the first processor performs the update process after performing a process requested by the user request.

2. The electronic apparatus as claimed in claim 1, wherein the second processor included in the sub control unit also stores, in the sub storage unit, update data storage information indicating that the software update data have been stored in the sub storage unit; and
after the electronic apparatus returns from the energy saving mode to the normal mode, the first processor included in the main control unit determines whether the software update request has been received during the energy saving mode based on the update data storage information stored in the sub storage unit and performs the update process if the software update request has been received.

3. The electronic apparatus as claimed in claim 1, wherein the second processor included in the sub control unit reports to the main control unit that the software update request has been received during the energy saving mode after the electronic apparatus returns from the energy saving mode to the normal mode; and
the first processor included in the main control unit performs the update process after the electronic apparatus returns from the energy saving mode to the normal mode if the second processor included in the sub control unit reports that the software update request has been received during the energy saving mode.

4. The electronic apparatus as claimed in claim 1, wherein the main control unit includes
a memory,
a loading unit loading the software stored in the main storage unit into the memory,
an information management unit managing information on the software, and
a state management unit managing a state of the software; and
after the electronic apparatus returns from the energy saving mode to the normal mode, the first processor included in the main control unit
terminates the software in the memory if the information management unit determines that the software can be safely terminated,
updates the software stored in the main storage unit if the state management unit determines that the software in the memory has been terminated, and
causes the loading unit to reload the updated software stored in the main storage unit into the memory.

5. The electronic apparatus as claimed in claim 1, wherein the second processor included in the sub control unit
displays the error information on an operations unit of the electronic apparatus if the software update request is input directly to the electronic apparatus during the energy saving mode; or
sends the error information to another apparatus if the software update request is received via a network from the other apparatus during the energy saving mode.

6. The electronic apparatus as claimed in claim 1, wherein the sub control unit further includes a setting unit setting an option indicating whether to automatically continue the update process when a size of the software update data is greater than a size of free space in the sub storage unit;
the second processor included in the sub control unit determines whether the size of the software update data is greater than the size of the free space in the sub storage unit, determines whether to automatically continue the update process based on the option set by the setting unit if the size of the software update data is greater than the size of the free space, and causes the electronic apparatus to return from the energy saving mode to the normal mode only when the update process is to be automatically continued; and
the first processor included in the main control unit performs the update process if the electronic apparatus is caused to return from the energy saving mode to the normal mode in response to the determination result to automatically continue the update process.

7. The electronic apparatus as claimed in claim 1, wherein
if the software update request is made during the normal mode via a storage medium storing the software update data and two programs to be executed, respectively, during the energy saving mode and the normal mode to transfer the software update data to the electronic apparatus, the first processor included in the main control unit reads the software update data from the storage medium according to a corresponding one of the programs; and
if the software update request is made during the energy saving mode via the recording medium, the first processor included in the sub control unit reads the software update data from the storage medium according to another one of the programs.

8. The electronic apparatus as claimed in claim 1, wherein when the size of the software update data is greater than the size of free space in the sub storage unit, the second processor causes a display unit to display a screen for allowing a user to determine whether to continue the update process; and when the user determines to continue the update process, the second processor causes the electronic apparatus to return from the energy saving mode to the normal mode and causes the first processor to update the software stored in the main storage unit with the software update data after the electronic apparatus returns to the normal mode.

9. A software update method performed by an electronic apparatus having a normal mode and an energy saving mode for reducing power consumption,
the electronic apparatus comprising:
a main control unit controlling the electronic apparatus and including a first processor, wherein the main control unit is configured to perform an updating process;
a sub control unit operating during the energy saving mode and including a second processor, wherein the sub control unit is configured to perform a process for storing software update data associated with the software update process, when a software update request is received from the outside during the energy saving mode;
a main storage unit accessible from the first processor; and
a sub storage unit accessible from the second processor, the software update method comprising the steps of:
determining, by the second processor, if the software update data can be stored in the sub storage unit based on a size of the update data and a size of free space in a storage unit for storing update data, when a software update request is received during the energy saving mode,
wherein if the second processor determines that the software update data cannot be stored, requesting by the second processor, the main control unit to cause the electronic apparatus to return from the energy saving mode to the normal mode,
wherein if the second processor determines that the software update data can be stored, performing by the sub control unit a control such that the main control unit performs the update process after the electronic apparatus returns from energy saving mode to the normal mode,
wherein when the size of the software update data is greater than the size of free space in the sub storage unit, the second processor suspends the update process and causes a display unit to display a screen for allowing a user to determine whether to continue the update process,
wherein when the user determines to continue the update process, the second processor causes the electronic apparatus to return from the energy saving mode to the normal mode and causes the first processor to update the software stored in the main storage unit with the software update data after the electronic apparatus returns to the normal mode, and
wherein if the software update request is received and the electronic apparatus returns from the energy saving mode to the normal mode in response to a user request having priority over the update process, the first processor performs the update process after performing a process requested by the user request.

10. The software update method as claimed in claim 9, further comprising the steps of:
storing, by the sub control unit, update data storage information in the sub storage unit, the update data storage information indicating that the software update data have been stored in the sub storage unit; and
after the electronic apparatus returns from the energy saving mode to the normal mode, determining, by the main control unit, whether the software update request has been received during the energy saving mode based on the update data storage information stored in the sub storage unit,
wherein the main control unit performs the update process if the software update request has been received.

11. The software update method as claimed in claim 9, further comprising the step of:
after the electronic apparatus returns from the energy saving mode to the normal mode, reporting from the sub control unit to the main control unit that the software update request has been received during the energy saving mode,
wherein the main control unit performs the update process after the electronic apparatus returns from the energy saving mode to the normal mode if the sub control unit reports that the software update request has been received during the energy saving mode.

12. A non-transitory computer-readable storage medium having a program stored therein for causing an electronic apparatus having a normal mode and an energy saving mode for reducing power consumption to perform a software update method, the electronic apparatus comprising:
a main control unit controlling the electronic apparatus and including a first processor, wherein the main control unit is configured to perform an updating process;
a sub control unit operating during the energy saving mode and including a second processor, wherein the sub control unit is configured to perform a process for storing software update data associated with the software update process, when a software update request is received from the outside during the energy saving mode;
a main storage unit accessible from the first processor; and
a sub storage unit accessible from the second processor, the software update method comprising the steps of:
determining, by the second processor, if the software update data can be stored in the sub storage unit based on a size of the update data and a size of free space in a storage unit for storing update data, when a software update request is received during the energy saving mode,
wherein if the second processor determines that the software update data cannot be stored, requesting by the second processor, the main control unit to cause the electronic apparatus to return from the energy saving mode to the normal mode,
wherein if the second processor determines that the software update data can be stored, performing by the sub control unit a control such that the main control unit performs the update process after the electronic apparatus returns from energy saving mode to the normal mode,
wherein when the size of the software update data is greater than the size of free space in the sub storage unit, the second processor suspends the update process and causes a display unit to display a screen for allowing a user to determine whether to continue the update process,
wherein when the user determines to continue the update process, the second processor causes the electronic apparatus to return from the energy saving mode to the normal mode and causes the first processor to update the software stored in the main storage unit with the software update data after the electronic apparatus returns to the normal mode, and wherein if the software update request is received and the electronic apparatus returns from the energy saving mode to the normal mode in response to a user request having priority over the update process, the first processor performs the update process after performing a process requested by the user request.

13. The storage medium as claimed in claim 12, the software update method further comprising the steps of:

storing, by the sub control unit, update data storage information in the sub storage unit, the update data storage information indicating that the software update data have been stored in the sub storage unit; and after the electronic apparatus returns from the energy saving mode to the normal mode, determining, by the main control unit, whether the software update request has been received during the energy saving mode based on the update data storage information stored in the sub storage unit, wherein the main control unit performs the update process if the software update request has been received.

14. The storage medium as claimed in claim 12, the software update method further comprising the step of:

after the electronic apparatus returns from the energy saving mode to the normal mode, reporting from the sub control unit to the main control unit that the software update request has been received during the energy saving mode, wherein the main control unit performs the update process after the electronic apparatus returns from the energy saving mode to the normal mode if the sub control unit reports that the software update request has been received during the energy saving mode.

* * * * *